May 6, 1941.                 J. A. HENCH                    2,240,889
                        WHEELED SECTIONAL HARROW
                         Filed July 15, 1940         2 Sheets-Sheet 1
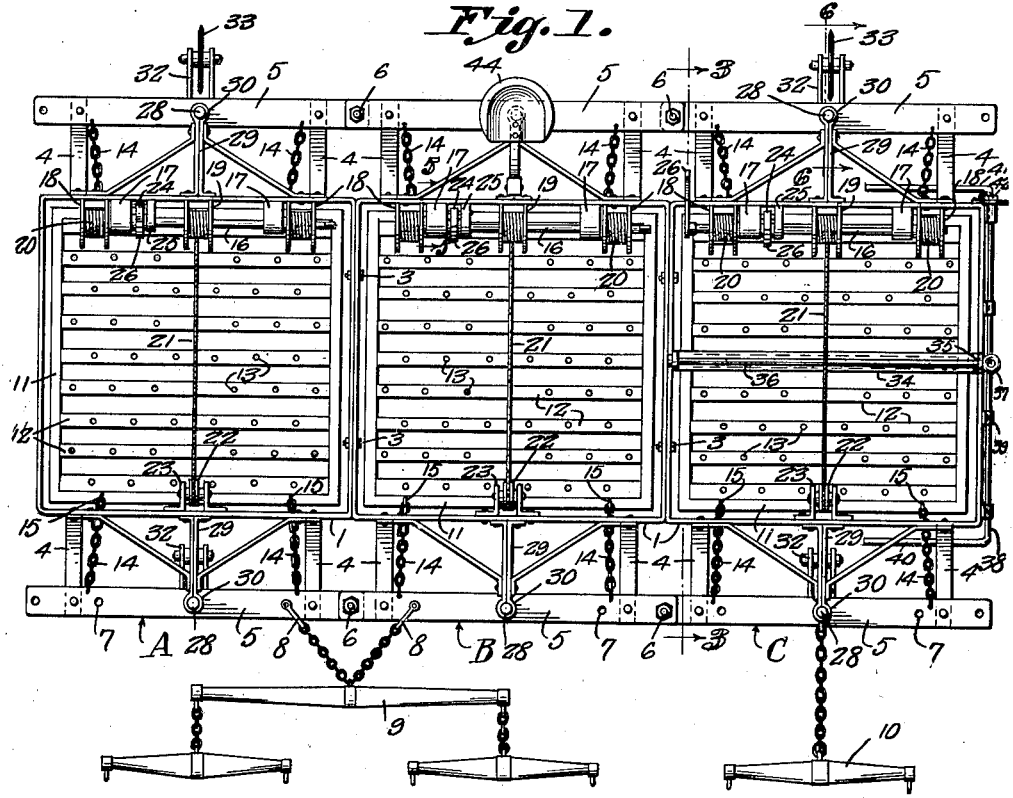
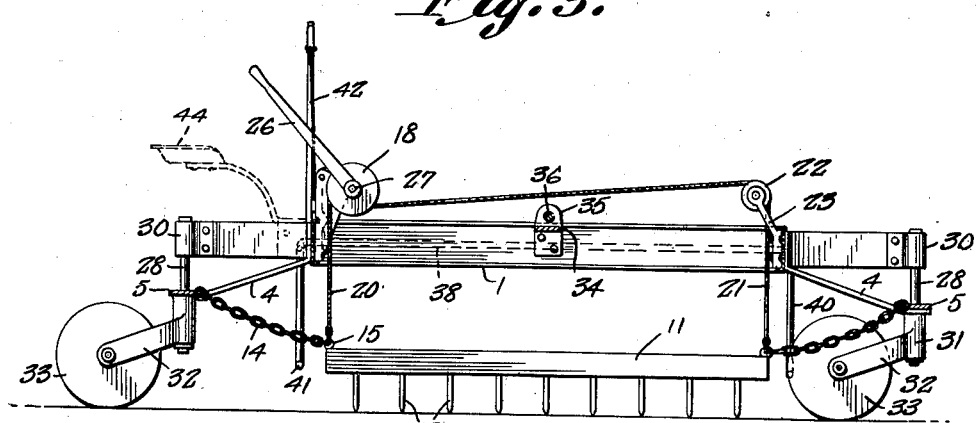
Jacob A. Hench, INVENTOR
BY Victor J. Evans & Co.
WITNESS                                                  ATTORNEYS

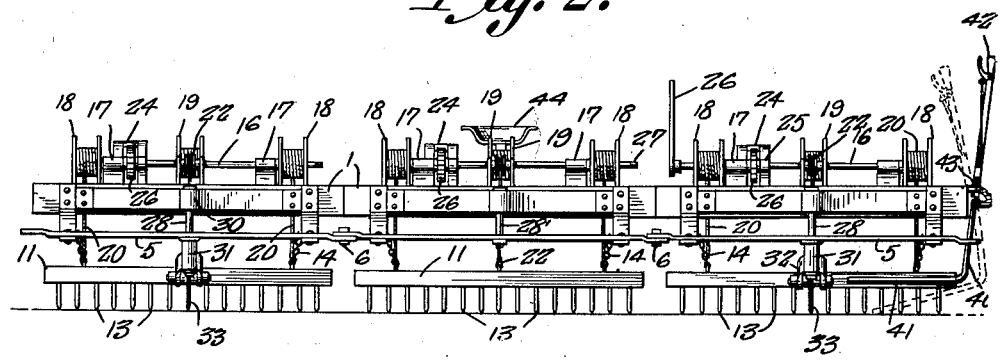
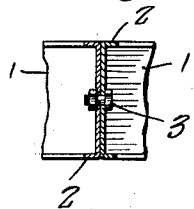
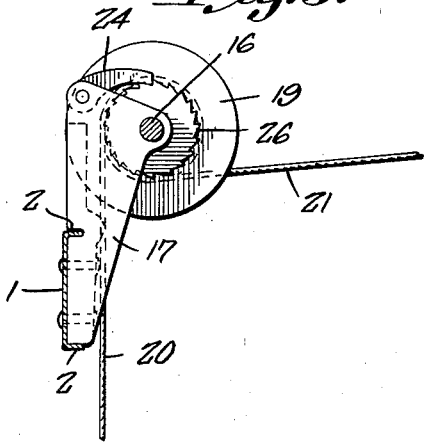
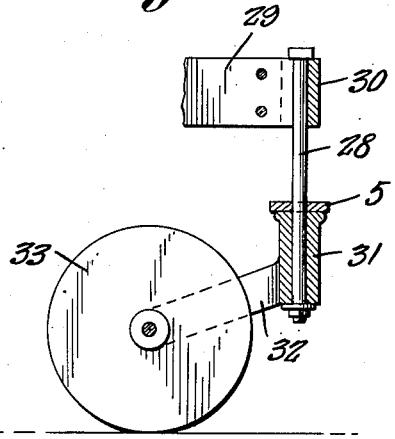

Patented May 6, 1941

2,240,889

UNITED STATES PATENT OFFICE 2,240,889

WHEELED SECTIONAL HARROW

Jacob A. Hench, Mankato, Minn.

Application July 15, 1940, Serial No. 345,683

9 Claims. (Cl. 55—88)

This invention relates to harrows, and its general object is to provide a wheeled sectional harrow that can be made up of any number of harrow sections, there being three different types of sections for that purpose, but each includes a swingingly mounted toothed unit and a supporting frame therefor, with means for lowering and raising the unit into and out of use, as well as for adjusting the unit at any ground penetrating height.

A further object is to provide a sectional harrow that includes wheel supported sections and sections having no wheels, and a harrow can be made up from sections to include two or more rigidly coupled wheeled sections for use, or one or more of the other sections may be rigidly coupled between the wheeled sections to be supported thereby, with the result it will be seen that a properly supported wheeled harrow of any desired length can be made from my sections, and the harrow is easy to handle regardless of the length thereof, especially due to the rigid connection between the sections.

Another object is to provide a harrow of the gang type that includes relatively small sections and hitch means may be attached to any of the sections for draft animals or tractors, for drawing the coupled sections while in use, and at least one of the wheeled sections is provided with hitch means for use in drawing any number of the coupled sections lengthwise from place to place such as from one field to another, as well as for passage through narrow gateways and the like, and the latter section or sections preferably have brake means to retard the movement of the harrow when descending a hill.

A still further object is to provide a sectional harrow that includes a removable seat or seats that can be attached to any of the sections and at any place thereon to suit the convenience of the operator.

Another object is to provide a harrow of the character set forth, that is simple in construction, inexpensive to manufacture, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a top plan view illustrating a harrow made up of the three different type sections which form the subject matter of my invention.

Figure 2 is a front view thereof.

Figure 3 is a sectional view taken approximately on line 3—3 of Figure 1, looking in the direction of the arrows.

Figure 4 is a vertical sectional view taken through the frame of two sections coupled together.

Figure 5 is a sectional view taken approximately on line 5—5 of Figure 1, looking in the direction of the arrows.

Figure 6 is a sectional view taken approximately on line 6—6 of Figure 1, looking in the direction of the arrows.

Referring to the drawings in detail, it will be noted that the three types of sections used for making up a harrow of any number of sections, are indicated by the letters A, B and C respectively.

While each of the sections A, B and C are different in some respects, the major structure thereof is the same, in that each section includes a body frame 1 that is shown as being square, but it can be oblong or any other suitable shape, and the frame 1 is provided with upper and lower inwardly directed marginal flanges 2, and openings are arranged along the longitudinal center of the sides thereof for receiving bolt and nut connections 3 for coupling the sections together in side by side relation, as shown in Figures 1 and 2.

Riveted or otherwise secured to the front and rear portions of the frame 1 adjacent to the ends thereof to extend outwardly therefrom at a downward inclination, are pairs of bracket strips 4 having fixed to the outer ends thereof, cross bars 5, each having openings adjacent to its ends for receiving bolt and nut connections 6 that cooperate with the bolt and nut connections 3 for coupling the sections together, and the front bars 5 are shown as having openings 7 therein for receiving clevis members 8 for a hitch 9 of the double tree type for attaching draft animals thereto, but it will be understood that a hitch may be used for connecting a tractor to the harrow for drawing the same. Any number of hitches may be used, it depending of course upon the number of sections coupled together. In fact, when the three sections shown are coupled together, and a double tree hitch for draft animals is to be used, I also provide a single tree hitch 10 for a third draft animal as will be apparent. While I have illustrated the clevis pin openings 7 in one bar of each section, they may be provided in the other bar thereof, as it makes no material difference whether the harrow is drawn from the front or the rear, as if the openings 7 are provided in both bars 5 of each section, either bar may be directed toward the front of the harrow.

Each section likewise includes a toothed unit 10 made up of a frame 11 shaped to conform with that of the body frame 1, but of a size for disposal therein in spaced relation thereto, to allow free vertical movement of the frame 11, for a purpose which will be presently described. The frame 11 has a plurality of equi-distantly spaced parallel members 12 secured to and bridging the same and suitably secured within the parallel members 12 for disposal in depending relation therefrom, is a plurality of ground penetrating teeth 13 arranged in rows throughout the length of said members, as clearly shown in Figures 1 and 3.

The toothed unit is connected to the bars 5 by flexible elements such as chains 14 having one of their ends secured to eyes 15 on the frame 11 and their opposite ends within openings in the bars 5, as best shown in Figure 3.

Each of the sections likewise include means for raising and lowering the toothed unit thereof into and out of use, as well as for adjusting the height of the teeth 13 within the ground, and the means for that purpose includes a shaft 16 rotatably mounted in a pair of spaced bearing brackets 17 secured to and rising from the rear portion of the body frame in the form shown. Fixed adjacent the ends of the shaft 16 are drums 18 and fixed midway the ends of the shaft is a drum 19. Secured to and wound about the drums 18 are cables 20 having their outer ends connected to the eyes 15 at the rear of the frame 11, while secured to and trained about the drum 19 is a cable 21 having its outer end connected to an eye 22 secured to the front of the frame 11 midway its ends, as best shown in Figure 2. The cable 21 is guided in its movement by a roller 22 journaled between a pair of bracket members 23 secured to and rising from the body frame 1 midway its ends, as best shown in Figure 1.

The toothed units are held at any desired height by dog and ratchet means, the dog 24 thereof being pivoted between one of the bearing brackets 17 and a bearing bracket 25, and the ratchet 26 is fixed to the shaft 16 which is rotated by a socket wrench like lever 26, the shaft having a square cornered end 27 for receiving the lever. The lever is preferably of the ratchet type, and while a lever can be provided for each shaft, and fixed thereto, the lever may be removable, so as to be applied to the shaft of each of the sections, as will be apparent upon inspection of Figures 1 and 2.

While each of the sections include all of the above described structure, it will be noted that only the two end sections A and C in the harrow shown are provided with wheels, there being a wheel at the front and rear ends of those two sections, and while each wheel is of the disk colter type, in the form shown, it will be obvious that other types of wheels may be employed. In any event, the wheels are of the caster type and each includes a shaft 28 in the form of a headed bolt. Extending outwardly from the body frame 1 of each of the sections A and C are brackets 29, the brackets 29 being fixed to the body frames 1 and provided with converging braces secured thereto and to the body frames, as shown. The brackets terminate at their outer ends in sleeves 30 having mounted therein the shafts 28 which extend through the cross bars 5. Rotatably mounted on the lower end portions of the shafts 28 and held thereon by nuts, are sleeves 31 having spaced parallel arms 32 formed thereon and between which are journaled disk wheels 33. By that construction, it will be obvious that the wheels are swiveled for movement in any direction with respect to the shafts 28.

In view of the fact that the section B is not provided with wheels, it is obvious that it must be used with at least two of the wheeled sections A and C and in the form shown, the section B is coupled between the sections A and C for the latter to support the section B. However, the section B is likewise provided with sleeved brackets 29, but mounted in the sleeves 30 thereof are short headed bolts 28' that extend through the bars 5 and secured accordingly by nuts.

While at least two wheeled sections must be used in making up a harrow from my sections, it will be obvious that any number of sections may be used for that purpose, with the wheeled sections arranged with respect to the intermediate sections so that the harrow will be properly supported, for example three wheeled sections may be used, with an intermediate section between the middle wheeled section and the end wheeled sections, or five wheeled sections may be used, and in that event there will be two middle and two end wheeled sections, with an intermediate section coupled to the outer sides of the middle wheeled sections for disposal therebetween and the end wheeled sections.

The wheeled section C differentiates from the wheeled section A to the extent that the section C is provided with a hitch for use in drawing the harrow lengthwise from the end thereof, from place to place such as from one field to another, as well as through narrow passages, for example a gateway or the like, and this hitch includes a bar 34 disposed in bridging relation with respect to the side members of the body frame 1 and having its ends downturned and riveted or otherwise secured to the side members. Formed on and rising from the ends of the bar 34 are apertured ears 35 having mounted and secured therein a rod 36 that is provided with an eye 37 for receiving a clevis member of suitable hitch means for draft animals or a tractor.

Suitable brake means is provided for the section C and which in the form shown includes a rod 38 having its intermediate portion rockably mounted in bearings 39 secured to the outer side member of the frame 1 of the section C. From the ends of the intermediate portion, the rod 38 is bent downwardly to provide right angle arms 40 having their lower portions 41 directed inwardly for disposal upon opposite sides of the front and rear of the body frame 1, as clearly shown in Figure 1. Fixed to the intermediate portion of the rod 38 is a lever 42 for moving the lower portions 41 into and out of engagement with respect to the ground, and the lever is provided with handled catch means 43 for holding the lower portions in either of their positions, as will be apparent upon inspection of Figure 2.

It will be obvious that only one of the sections C is necessary in making up a harrow regardless of the number of other sections used, and the section C is always disposed at one end, so as to be available accordingly for attaching horses or a tractor thereto for drawing the harrow as and for the purpose previously set forth.

While the seat 44 is shown as being connected to the intermediate section B, as that is the most convenient location therefor, when the three sections shown are coupled together for use, the seat is removable for attachment to any of the other sections, and when moving the harrow from place to place through the medium of the rod hitch means of the section C, the seat is preferably attached to that section. However, a seat may be permanently fixed to section C if such is found necessary or desirable, and the seat 44 may be permanently fixed to the section B.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A harrow comprising coupled sections, each section including a body frame, toothed means vertically movable within and below the body frame for disposal into and out of ground working position, means swingingly supporting the toothed means and for moving the latter to its respective positions, and flexible means for limiting the swinging movement of the toothed means.

2. A wheeled harrow comprising coupled sections, each section including a body frame, a toothed unit including a frame conforming in shape to that of the body frame and movable within and below the latter for disposal into and out of ground working position, toothed means secured to and bridging the unit frame, means swingingly supporting said unit and including a shaft rotatably mounted on the body frame, drums fixed to the shaft, cables fixed to the drums and to opposite portions of the unit frame respectively for moving said unit to its respective positions, and flexible means for limiting the swinging movement of said unit.

3. A wheeled harrow comprising sections, each section including a body frame, a toothed unit including a frame conforming in shape to that of the body frame and movable within and below the latter for disposal into and out of ground working position, toothed means secured to and bridging the unit frame, means swingingly supporting said unit and including a shaft rotatably mounted on the body frame, drums fixed to the shaft, cables fixed to the drums and to the opposite portions of the unit frame respectively for moving said unit to its respective positions, a handle for rotating the shaft, brackets secured to and extending outwardly from the front and rear portions of the body frame, bars secured to and bridging the outer ends of the brackets, flexible means secured to and disposed between the unit frame and the bars for limiting the swinging movement of said unit, and means connecting the ends of the bars of each section to each other and the side portions of the body frames to each other for coupling the sections together in side by side relation.

4. A wheeled harrow comprising sections, each section including a body frame, a toothed unit including a frame conforming in shape to that of the body frame and movable within and below the latter for disposal into and out of ground working position, toothed means secured to and bridging the unit frame, means swingingly supporting said unit and including a shaft rotatably mounted on the body frame, drums fixed to the shaft, cables fixed to the drums and to the opposite portions of the unit frame respectively for moving said unit to its respective positions, a handle for rotating the shaft, brackets secured to and extending outwardly from the front and rear portions of the body frame, bars secured to and bridging the outer ends of the brackets, flexible means secured to and disposed between the unit frame and the bars for limiting the swinging movement of said unit, means connecting the ends of the bars of each section to each other and the side portions of the body frames to each other for coupling the sections together in side by side relation, operator seating means for the harrows, and hitch means connected to the harrow for attachment of draft means with respect thereto.

5. A wheeled harrow comprising coupled sections, each section including a body frame, a toothed unit including a frame conforming in shape to that of the body frame and movable within and below the latter for disposal into and out of ground working position, toothed means secured to and bridging the unit frame, means swingingly supporting said unit and including a shaft rotatably mounted on the rear portion of the body frame, drums fixed to the shaft adjacent the ends thereof, an intermediate drum fixed to the shaft substantially midway its ends, cables fixed to the end drums and the rear portion of the unit frame, a cable fixed to the intermediate drum and the front portion of the unit frame, guiding means for the latter cable and fixed to the front portion of the body frame, a handle for rotating the shaft for moving said unit to its respective positions, dog and ratchet means for the shaft, and flexible means for limiting the swinging movement of said unit.

6. A harrow comprising end sections, wheels for the end sections, an intermediate section coupled to and between the end sections to be supported thereby, ground working toothed means included in each section, means for supporting and moving the toothed means into and out of use, and hitch means for the harrow and including means extending laterally from one end section for use in drawing the harrow lengthwise thereof when not in use.

7. A harrow comprising end sections, an intermediate section coupled to and between the end sections to be supported thereby, each section including a body frame, toothed means vertically movable within and below the body frame for disposal into and out of use, means for swingingly supporting said toothed means and for moving the latter to its respective positions, brackets secured to and extending outwardly from the front and rear portions of the body frame, bars secured to and bridging the outer ends of the brackets, flexible means secured to and disposed between the toothed means and the bars for limiting the swinging movement of the toothed means, sleeved brackets secured to and extending forwardly and rearwardly from the body frame, shafts mounted in the sleeved brackets and extending through the bars, and caster wheels of the colter type swiveled on the lower portions of the shafts.

8. In a sectional harrow, an end section comprising a body frame, toothed means vertically movable within and below the body frame for disposal into and out of ground working position, means swingingly supporting the toothed means and for moving the latter to its respective positions, flexible means for limiting the swinging movement of the toothed means, a bar secured to and bridging the side portions of the body frame, apertured ears formed on the bar and rising from the ends thereof, a rod paralleling the bar and secured to the ears, and said rod terminating in an eye at one end for receiving hitch means for drawing the harrow lengthwise when not in use.

9. In a sectional harrow, a wheeled end section comprising a body frame, ground working toothed means carried by the body frame, bearings mounted on the outer side portion of the body frame, a brake rod rockably mounted in the bearings and including depending portions, rearwardly directed ground engaging portions formed on the depending portions, handled means secured to the rod for rocking the same to move the ground engaging portions into and out of use, and catch means for the handled means for holding the ground engaging portions against casual movement.

JACOB A. HENCH.